United States Patent
Rosenquist et al.

(10) Patent No.: US 9,676,939 B2
(45) Date of Patent: Jun. 13, 2017

(54) HEAT RESISTANT CLEAR POLYCARBONATE-POLYSILOXANE COMPOUNDS

(71) Applicant: SABIC GLOBAL TECHNOLOGIES B.V., Bergen op Zoom (NL)

(72) Inventors: Niles Rosenquist, Evansville, IN (US); Srinivas Siripurapu, Evansville, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/794,768

(22) Filed: Jul. 8, 2015

(65) Prior Publication Data
US 2015/0307706 A1 Oct. 29, 2015

Related U.S. Application Data

(63) Continuation of application No. 13/077,397, filed on Mar. 31, 2011, now Pat. No. 9,115,283.

(51) Int. Cl.
*C08L 69/00* (2006.01)
*C08L 83/10* (2006.01)

(52) U.S. Cl.
CPC .............. *C08L 69/00* (2013.01); *C08L 83/10* (2013.01)

(58) Field of Classification Search
CPC .................................. C08L 69/00; C08L 83/10
See application file for complete search history.

(56) References Cited

U.S. PATENT DOCUMENTS

| 5,455,310 | A | 10/1995 | Hoover et al. | |
|---|---|---|---|---|
| 7,232,865 | B2 | 6/2007 | DeRudder et al. | |
| 7,408,016 | B2* | 8/2008 | Chatterjee | C08G 64/12 528/271 |
| 7,709,581 | B2 | 5/2010 | Glasgow et al. | |
| 2004/0220330 | A1* | 11/2004 | DeRudder | C08G 64/186 524/837 |
| 2006/0002814 | A1 | 1/2006 | Chatterjee et al. | |
| 2009/0023871 | A9* | 1/2009 | Fujiguchi | C08L 69/00 525/464 |
| 2010/0129649 | A1 | 5/2010 | Malinoski et al. | |

FOREIGN PATENT DOCUMENTS

| CN | 101511912 | 8/2009 |
|---|---|---|
| WO | 2008042491 | 4/2008 |
| WO | 2012134837 | 10/2012 |

OTHER PUBLICATIONS

European Examination Report for Application 12 710 640.9-1306 dated Apr. 22, 2015 (3 pages).
International Search Report from corresponding International Patent Application No. PCT/US2012/029388, dated Jun. 27, 2012.
English translation of Notification of the First Office Action from The State Intellectual Property Office of the People's Republic of China for Application No. 201280014421.9 dated Jun. 3, 2014 (10 pages).
English translation of Notice of Second Examination Opinion from The State Intellectual Property Office of the People's Republic of China for Application No. 201280014421.9 dated Dec. 24, 2014 (5 pages).
English translation of Notification of the Third Office Action from The State Intellectual Property Office of the People's Republic of China for Application No. 201280014421.9 dated Jun. 9, 2015 (9 pages).

* cited by examiner

*Primary Examiner* — Robert Jones, Jr.
(74) *Attorney, Agent, or Firm* — Michael Best & Friedrich LLP

(57) ABSTRACT

Provided herein are polycarbonate blend compositions, methods for making polycarbonate blend compositions and articles containing the polycarbonate blend composition, wherein the polycarbonate blend composition comprises a first polycarbonate and a second polycarbonate wherein the polycarbonate blend has a glass transition temperature (Tg) between 148° C. and 155° C. as measured using a differential scanning calorimetry method; a percent (%) haze of less than 3.5% and a % transmission of greater than 80% as measured using a method of ASTM D 1003-07, and wherein the blend composition possesses 80% or greater ductility in a notched izod test at −20° C. at a thickness of 0.125 inches according to ASTM D256-10.

24 Claims, No Drawings

HEAT RESISTANT CLEAR POLYCARBONATE-POLYSILOXANE COMPOUNDS

CROSS REFERENCE TO RELATED APPLICATION(S)

This is a continuation of U.S. patent application Ser. No. 13/077,397, filed on Mar. 31, 2011, the entire contents of which are fully incorporated herein by reference.

FIELD OF THE INVENTION

The present invention relates to the development and use of heat resistant clear polycarbonate-polysiloxane compositions and uses thereof.

BACKGROUND

Polycarbonates are synthetic thermoplastic resins that may be derived from bisphenols and phosgene, or their derivatives. The desired properties of polycarbonates include clarity or transparency, high impact strength and toughness, heat resistance, weather and ozone resistance, and good ductility. They are useful for forming a wide variety of products, such as by molding, extrusion, and thermoforming processes. Such products include articles and components that include auto parts, electronic appliances and cell phone components. Because of their broad use, particularly in electronic applications or visually oriented applications, such as light covers, see-through protective coverings, lenses, and transparent films, it is desirable to provide polycarbonates with excellent weatherability, heat resistance, impact strength, and transparency.

Prior means of improving impact performance of polycarbonates have often resulted in articles of manufacture that have a significant loss of heat resistance and/or transparency. Polysiloxane polycarbonates have provided improved impact strength performance and improved solvent resistance with substantial retention of transparency compared to PC homopolymers. However, polysiloxane polycarbonates exhibit lower heat resistance compared to other polycarbonates and thus their utility is limited in some commercial applications.

There is a need for producing blends of high transparent and heat resistant polymers without substantially compromising the desired transparency and impact strength properties.

SUMMARY OF THE INVENTION

The present invention is directed to a polycarbonate blend composition comprising (a) a first polycarbonate having a glass transition temperature of greater than 170° C. as measured using a differential scanning calorimetry method, wherein the first polycarbonate is derived from: one or more monomers having the structure $HO-A_1-Y_1-A_2-OH$ wherein each of $A_1$ and $A_2$ comprise a monocyclic divalent arylene group, and $Y_1$ is a bridging group having one or more atoms, and wherein the structure is free of halogen atoms; or polyester monomer units having the structure

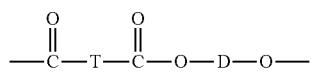

wherein D comprises one or more alkyl containing $C_6$-$C_{20}$ aromatic group(s), or one or more $C_6$-$C_{20}$ aromatic group(s), and T comprises a $C_6$-$C_{20}$ aromatic group; and (b) a second polycarbonate wherein the second polycarbonate is a polysiloxane block copolymer derived from
(i) the structure

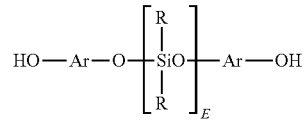

wherein R comprises a $C_1$-$C_{30}$ aliphatic, a $C_1$-$C_{30}$ aromatic group, or a combination thereof, wherein Ar comprises one or more $C_6$-$C_{30}$ aromatic group(s), or one or more alkyl containing $C_6$-$C_{30}$ aromatic group(s), wherein E has an average value of 20-75; or
(ii) the structure

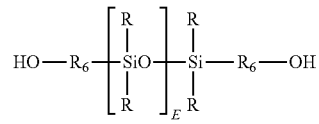

wherein R comprises a $C_1$-$C_{30}$ aliphatic, a $C_1$-$C_{30}$ aromatic group, or a combination thereof, wherein R6 comprises a $C_7$-$C_{30}$ aromatic group, or a combination of a $C_7$-$C_{30}$ aromatic group and a $C_7$-$C_{30}$ aliphatic group, wherein E has an average value of 20-75; wherein the blend composition has a glass transition temperature (Tg) between 148° C. and 155° C. as measured using a differential scanning calorimetry method; wherein the blend composition has a percent (%) haze of less than 3.5% and a % transmission of greater than 80% as measured using a method of ASTM D 1003-07; wherein the blend composition possesses 80% or greater ductility in a notched izod test at −20° C. at a thickness of 0.125 inches according to ASTM D 256-10.

The blend composition may have an MVR of between 6 and 12 cm³/10 minute as measured at 300° C. at 1.2 kilograms using the method of ASTM D 1238-10. The blend second polycarbonate of the blend composition may further comprise a carbonate unit derived from the polysiloxane blocks having the structure

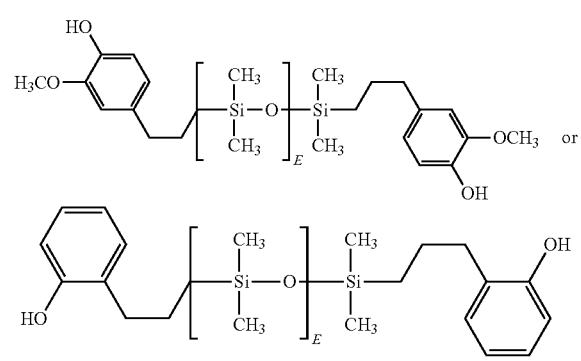

wherein E has an average value of between 20 and 75.
The first polycarbonate comprises carbonate units derived from the monomers 3,3-bis(4-hydroxyphenyl)-2-phenylisoindolin-1-one (PPPBP), 1,1-bis(4-hydroxyphenyl)-1-phenyl-ethane (Bisphenol-AP), and/or 1,1-bis(4-hydroxyphenyl)-3,3,5-trimethyl-cyclohexane (Bisphenol-TMC) or a combination thereof.

The first polycarbonate of the blend composition may comprise greater than 30 wt % of carbonate units derived from 3,3-bis(4-hydroxyphenyl)-2-phenylisoindolin-1-one (PPPBP), 1,1-bis(4-hydroxyphenyl)-1-phenyl-ethane (Bisphenol-AP), and/or 1,1-bis(4-hydroxyphenyl)-3,3,5-trimethyl-cyclohexane (Bisphenol-TMC) or a combination thereof. The first polycarbonate of the blend composition may comprise a % haze of less than 1.5% as measured using the method of ASTM D 1003-07 at 0.125 inches in part thickness. The first polycarbonate of the blend composition may further comprise 2,2-bis(4-hydroxyphenyl)propane (Bisphenol-A). The first polycarbonate of the blend composition may further comprise aromatic ester units derived from isophthalic acid or terephthalic acids or isophthalic acid esters or terephthalic esters or a combination isophthalic acid or terephthalic acids or isopthalic acid esters or terephthalic acid esters. The first polycarbonate of the blend composition may further comprise carbonate units or ester units derived from Bisphenol-A.

The second polycarbonate of the blend composition may have a haze of less than 3% as measured using the method of ASTM D 1003-07 at 0.125 inches in part thickness and having 100% ductility at −20° C. as measured using the method of ASTM D 256-10 at 0.125 inches in part thickness. The first and second polycarbonates of the blend composition may be made from either an interfacial polymerization process or a melt polymerization process. The blend composition may contain a wt % siloxane in the second polycarbonate that is between 5 wt % and 7 wt % based on the total weight of the second polycarbonate. The blend composition may contain a wt % of the siloxane in the blend composition that is between 4 wt % and 6 wt % based on the total weight of the polycarbonate blend composition.

The second polycarbonate of the blend composition may comprise greater than 75 wt % of the polycarbonate blend composition and wherein the first polycarbonate comprises less than 25 wt % of the polycarbonate blend composition based on the sum of the first and second polycarbonates being equal to 100 wt %. The first polycarbonate of the blend composition may comprise 4,4'-(3,3,5-trimethylcyclohexane-1,1-diyl)diphenol.

The present invention is also directed to a polycarbonate blend composition comprising: a first polycarbonate, which is a copolycarbonate having a glass transition temperature of 170° C. or greater as measured using differential scanning calorimetry and derived from a combination of bisphenol-A and a second monomer that is free of halogens and having the structure

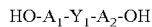

wherein each of $A_1$ and $A_2$ comprises a monocyclic divalent arylene group, and $Y_1$ comprises at least one of the following: —O—, —S(O)—, —S(O)2-, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene, wherein $A_1$, $A_2$ and $Y_1$ are free of halogen atoms; and a second polycarbonate, which is a polysiloxane block copolycarbonate derived from at least bisphenol-A and

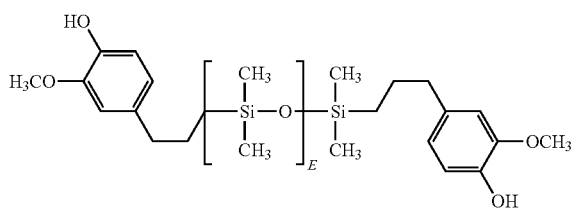

wherein the average value of E is between 30 and 50, or

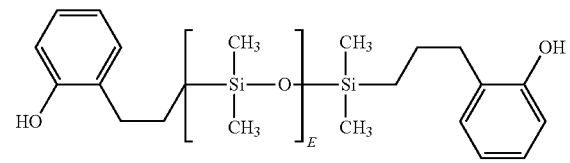

wherein the average value of E is between 30 and 50, wherein the siloxane content in the polysiloxane block co-polycarbonate is between 2 wt % and 10 wt % siloxane based on the total weight of the polysiloxane block co-polycarbonate; wherein the polycarbonate blend composition comprises between 10% and 20% of the first polycarbonate and between 90 wt % and 80 wt % of a second polycarbonate based on the sum of the first and the second polycarbonate being equal to 100 wt %; wherein the polycarbonate blend composition has a glass transition temperature (Tg) of between 148° C. and 155° C. as measured using a differential scanning calorimetry method; wherein the polycarbonate blend composition has a % haze of less than 3% and a % transmission of greater than 80% as measured using the method of ASTM D 1003-07; and, wherein the polycarbonate blend composition possesses at least 75% ductility in a notched izod test at −20° C. at a thickness of 0.125 inches according to ASTM D 256-10. The first polycarbonate is derived from at least Bisphenol-A and one or more of the monomers, 3,3-bis(4-hydroxyphenyl)-2-phenylisoindolin-1-one (PPPBP), Bisphenol-AP, Bisphenol-TMC or a combination of isophthalic and phthalic acids or a combination of isophthalic and phthalic acid esters. The blend composition may further comprise at least one of the following additives: mold release agents, thermal stabilizers, UV stabilizers, or colorants.

The present invention is also directed to a polycarbonate blend composition comprising: a first polycarbonate comprising carbonate units derived from bisphenol-A and 3,3-bis(4-hydroxyphenyl)-2-phenylisoindolin-1-one (PPPBP), wherein the first polycarbonate has a mole % of carbonate units derived from PPPBP between 30-35 mole % and a mole % carbonate units derived from Bisphenol-A between 65 and 70 mole %, a second polycarbonate comprising carbonate units derived from Bisphenol-A and carbonate units derived from

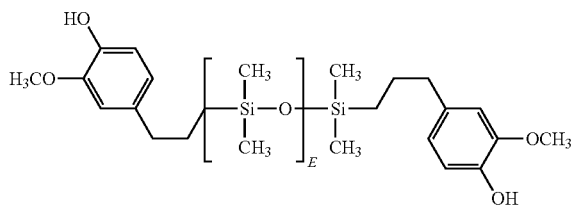

wherein, E has an average value of between 40 and 50 and wherein the wt % siloxane in the second polycarbonate is between 5 wt % and 7 wt % based on the weight of the second polycarbonate being 100%; wherein, the first polycarbonate comprises between 10-20 wt % and the second polycarbonate comprises between 80-90 wt % based on the wt % of the first and the second polycarbonate being 100%; wherein the polycarbonate blend composition comprises between 10% and 20% of the first polycarbonate and between 80 wt % and 90 wt % of the second polycarbonate based on the sum of the first and the second polycarbonate being equal to 100 wt %; wherein, the polycarbonate blend composition has a glass transition temperature (Tg) of between 148° C. and 155° C. as measured using a differential scanning calorimetry method; wherein, a molded article of the polycarbonate blend composition has a % haze of less than 3% and a % transmission of greater than 80% as measured using the method of ASTM D 1003-07 at 0.125 inches in part thickness; wherein the polycarbonate blend composition possesses at least 75% ductility in a notched izod test at −20° C. at a thickness of 0.125 inches according to ASTM D 256-10.

The present invention is also directed to a method for making a polycarbonate blend composition comprising the steps of (a) selecting a first polycarbonate; (b) selecting a second polycarbonate; and (c) blending the first polycarbonate with the second polycarbonate to form a composition having a glass transition temperature (Tg) of between 145° C. and 155° C. as measured using a differential scanning calorimetry method, a % haze of less than 3.5% and a % transmission of greater than as measured using the method of ASTM D 1003-07; and, possesses 80% or greater ductility in a notched izod test at −20° C. at a thickness of 0.125 inches according to ASTM D 256-10. The first polycarbonate comprises carbonate units derived from at least Bisphenol-A and one or more of the following monomers PPPBP; Bisphenol-A; Bisphenol-TCM; a combination of isophthalic and phthalic acids; and a combination of isophthalic and phthalic acid esters. The second polycarbonate comprises carbonate units derived from Bisphenol-A and

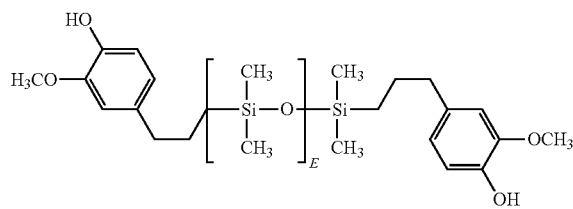

wherein the average value of E is between 30 and 50, or

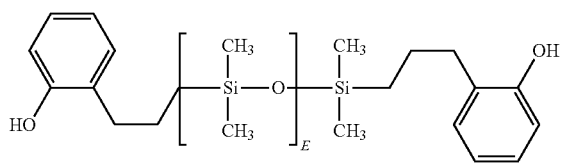

wherein the average value of E is between 30 and 50. Step (c) of the method may comprise extrusion.

The present invention is also directed to an article molded from a polycarbonate blend composition described above. The article can be a component of a cell phone cover or computer housing, wherein the article may be molded from the polycarbonate blend composition(s) encompassed by this disclosure.

DETAILED DESCRIPTION

The present invention is directed to a polycarbonate blend composition having a combination of a high heat polycarbonate (as described in this disclosure) and a polycarbonate polysiloxane copolymer (as described in this disclosure).

1. DEFINITIONS

The terminology used herein is for the purpose of describing particular embodiments only and is not intended to be limiting. As used in the specification and the appended claims, the singular forms "a," "and" and "the" include plural references unless the context clearly dictates otherwise.

"Alkyl" as used herein may mean a linear, branched, or cyclic group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Copolymer" as used herein may mean a polymer derived from two or more structural unit or monomeric species, as opposed to a homopolymer, which is derived from only one structural unit or monomer.

"$C_3$-$C_6$ cycloalkyl" as used herein may mean cyclopropyl, cyclobutyl, cyclopentyl and cyclohexyl.

"Glass Transition Temperature" or "Tg" as used herein may mean the maximum temperature that a polycarbonate will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polycarbonate may depend primarily on the composition of the polycarbonate. Polycarbonates that are formed from monomers having more rigid and less flexible chemical structures than Bisphenol-A generally have higher glass transition temperatures than Bisphenol-A, while polycarbonate that are formed from monomers having less rigid and more flexible chemical structures than Bisphenol-A, for example, generally have lower glass transition temperatures than Bisphenol-A. For example, a polycarbonate described herein formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate described herein formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of the corresponding polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature "Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Haze" as used herein may mean that percentage of transmitted light, which in passing through a specimen deviates from the incident beam by forward scattering. Percent (%) haze may be measured according to ASTM D 1003-07.

"Heteroaryl" as used herein may mean any aromatic heterocyclic ring which may comprise an optionally benzo-condensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"Melt Volume Rate" (MVR) as used herein may mean the flow rate of a polymer in a melt phase as determined using the method of ASTM 1238-10. The MVR of a molten polymer is measured by determining the amount of polymer that flows through a capillary of a specific temperature over a specified time using standard weights at a fixed temperature. MVR is expressed in cubic centimeter per 10 minutes. The higher the MVR value of a polymer at a specific temperature, the greater the flow of that polymer at that specific temperature.

"Percent transmission" or "% transmission" as used herein may mean the ratio of transmitted light to incident light and may be measured according to ASTM D 1003-07.

"PETS release agent" as used herein may mean pentaerythritol tetrastearate, mold release.

"Phosphite stabilizer" as used herein may mean tris-(2,4-di-tert-butylphenyl) phosphite.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. POLYCARBONATE BLEND COMPOSITION

The herein described polycarbonate blend composition comprises a first polycarbonate and a second polycarbonate. The polycarbonate blend composition provides improved impact strength performance and improved solvent resistance while substantially retaining transparency typical of polycarbonate homopolymers. The polycarbonate blend composition further provides heat resistance characteristics similar to those of BPA polycarbonate homopolymers.

The polycarbonate blend may comprise greater than 50 wt %, 60 wt %, 65 wt %, 70 wt %, 75 wt %, 80 wt %, 85 wt %, 90 wt %, or 95 wt % of the second polycarbonate. The polycarbonate may comprise between 80 wt % and 90 wt % of the second polycarbonate. The polycarbonate blend may comprise less than 50 wt %, 40 wt %, 35 wt %, 30 wt %, 25 wt %, 20 wt %, 15 wt %, 10 wt %, or 5 wt % of the first polycarbonate. The polycarbonate blend may comprise between 10 wt % and 20 wt % of the first polycarbonate. The sum of the weight (wt) percentages for the first and second polycarbonates may equal 100 wt %. The first and/or second polycarbonate may be branched.

The polycarbonate blend composition may have a glass transition temperature (Tg) of between 140° C. and 160° C., between 145° C. and 155° C., between 148° C. and 151° C., or between 148° C. and 155° C. as measured using differential scanning calorimetry.

The polycarbonate blend composition may have a percent (%) haze of less than 5%, 4.5%, 4.0%, 3.5%, 3.0%, 2.5%, 2.0% or 1.0% using the method of ASTM D 1003-07 on parts 0.125 inches in thickness. The polycarbonate blend composition may have a transmission of greater than 65%, 70%, 75%, 80%, 85%, 90%, or 95% as measured using the method of ASTM D 1003-07 on parts 0.125 inches in thickness. The polycarbonate blend composition may have a percent haze of less than of 3.5% and a percent transmission of greater than 80% as measured using a method of ASTM D 1003-07 on parts 0.125 inches in thickness. The polycarbonate blend composition may have a percent haze of less than of 3.0% and a percent transmission of greater than 80% as measured using a method of ASTM D 1003-07 on parts 0.125 inches in thickness.

The polycarbonate blend composition may possess 60%, 65%, 70%, 75%, 80%, 85%, 90%, 95% or greater ductility in a notched izod test at −10° C., −15° C., −20° C., −25° C., −30° C., or −35° C. at a thickness of 0.125 inches according to ASTM D 256-10. The polycarbonate blend composition may possess 100% ductility in a notched izod test at −10° C., −15° C., −20° C., −25° C., −30° C., or −35° C. at a thickness of 0.125 inches according to ASTM D 256-10. Notched Izod measurements, in accordance with ASTM D 256-10, may be conducted on test bars that measure 0.125 in thickness by 0.5 in wide and 2.5 long at room temperature (23° C.) and lower temperatures as indicated in the tables provided in the Examples below. The polycarbonate blend composition may possess an 80% or greater ductility in a notched izod test at −20° C. at a thickness of 0.125 inches according to ASTM D 256-10. For example, if the blend composition exhibits 100% ductility, then if 5 samples are tested in a notched izod protocol, all 5 samples exhibit ductile breaks. A sample may mean a polycarbonate test bar. The test bar may have a defined thickness. The polycarbonate test bar has undergone ductile failure in a notched izod test if, after impact, the bar remains as a single piece, with the two ends of the bar attached and rigid (i.e. self supporting). A test bar has undergone brittle failure if after impact either the two ends of the bar have broken into two separate pieces or if they are attached by only a thin, flexible connection of plastic.

MVR measures the rate of extrusion of a thermoplastic through an orifice at a prescribed temperature and load. MVR may be measured in according to the method ASTM D 1238-10 at 1.2 kilogram at 300° C. The herein described polycarbonate blend compositions may have an MVR of 4 to 12 cubic centimeters, of 5 to 11 cubic centimeters, of 6 to 10 cubic centimeters, of 7 to 9 cubic centimeters, 6 to 12 cubic centimeters, 8 to 12 cubic centimeters, or 6.5 to 10.5 cubic centimeters per 10 minutes (cc/10 min). In a specific embodiment, a suitable polycarbonate composition has an MVR measured at 300° C./1.2 kg according to ASTM D 1238-10, of 0.5 to 50 cc/10 min, specifically 1 to 25 cc/10 min, and more specifically 3 to 20 cc/10 min. Mixtures of polycarbonates of different flow properties may be used to achieve the overall desired flow property.

The polycarbonate blend composition may exhibit heat resistance similar to a bisphenol A polycarbonate homopolymer. The polycarbonate blend composition exhibits a heat resistance that is higher than the second polycarbonate in the blend as described below. The polycarbonate blend composition exhibits heat resistance lower than the levels achieved with the first polycarbonate as described below.

a. First Polycarbonate—

Described herein is the first polycarbonate of the polycarbonate blend composition. The first polycarbonate may be a homopolycarbonate or a copolycarbonate derived from one dihydroxy monomer or a combination of two or more dihydroxy aromatic monomers, respectively, such that the glass transition temperature of the homopolycarbonate or the copolycarbonate has a Tg of at least 170° C. The dihydroxy aromatic monomer of the homopolycarbonate must produce a polycarbonate with a Tg of >170° C. If more than one dihydroxy aromatic monomers are present in the copolycarbonate, the combination of dihydroxy aromatic monomers must produce a polycarbonate with a Tg of >170° C.

The first polycarbonate may alternatively be a polyester polycarbonate copolymer having a Tg of at least 170° C. The polyester polycarbonate may be a combination of a polyester structural unit and a polycarbonate structural unit. The polyester structural unit may be derived from a $C_6$-$C_{20}$ aromatic dicarboxylic acid and one or more dihydroxy aromatic monomers. The polycarbonate structural unit may be derived from one or more dihydroxy aromatic monomers. The dihydroxy aromatic monomers of the polyester structural unit and the polycarbonate structural unit may be the same or different. Details of these structural units of the first polycarbonate are discussed below.

(1) Homopolycarbonate/Copolycarbonate

The first polycarbonate may be a homopolycarbonate or a copolycarbonate. The term "polycarbonate" and "polycarbonate resin" mean compositions having repeating structural carbonate units of the formula (1):

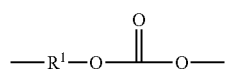

(1)

in which at least about 60% of the total number of $R^1$ groups are aromatic organic groups and the balance thereof are aliphatic, alicyclic, or aromatic groups. In one embodiment, each R1 is an aromatic organic group, for example a group of the formula (2):

$$-A^1-Y^1-A^2-$$ (2)

wherein each of $A^1$ and $A^2$ is a monocyclic divalent aryl group and $Y^1$ is a bridging group having one or two atoms that separate $A^1$ from $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene.

The polycarbonates may be produced from dihydroxy compounds having the formula HO—$R^1$—OH, wherein $R^1$ is defined as above for formula (1). The formula HO—$R^1$—OH includes bisphenol compounds of formula (3):

$$HO-A^1-Y^1-A^2-OH$$ (3)

wherein $Y^1$, $A^1$ and $A^2$ are as described above. Included are bisphenol compounds of general formula (4):

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

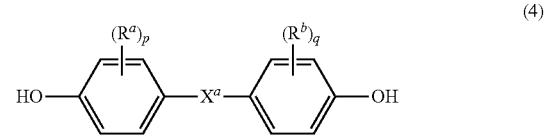

(5)

wherein $R^c$ and $R^d$ each independently represent a hydrogen atom or a monovalent linear alkyl or cyclic alkylene group and $R^e$ is a divalent hydrocarbon group. In an embodiment, $R^c$ and $R^d$ represent a cyclic alkylene group; or a heteroatom-containing cyclic alkylene group comprising carbon atoms and heteroatoms with a valency of two or greater. In an embodiment, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)—, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units may be used, for example, bisphenol of formula (6):

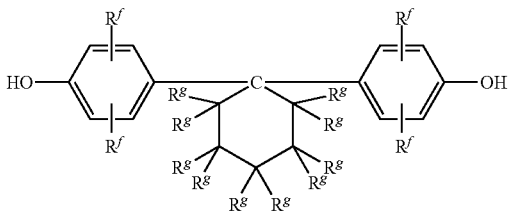

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight-chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures.

Other useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 1,1-bis(4-hydroxy-3-methylphenyl)cyclohexane (DMBPC). Combinations comprising at least one of the foregoing dihydroxy compounds may also be used.

The dihydroxy compounds of formula (3) may be the following formula (8):

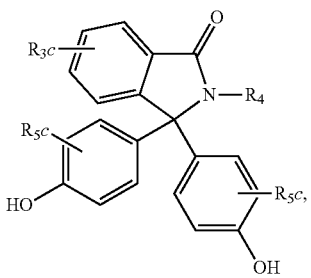

(8)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

The dihydroxy compounds of formula (3) may be the following formula (9):

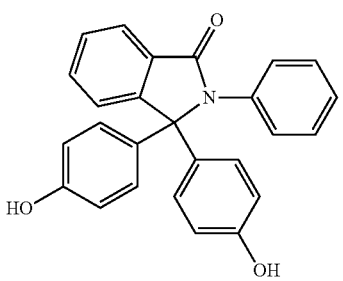

(9)

(also known as 3,3-bis(4-hydroxyphenyl)-2-phenylisoindolin-1-one (PPPBP)).

Alternatively, the dihydroxy compounds of formula (3) may be the following formula (10):

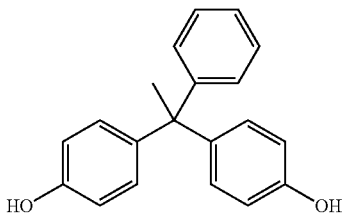

(10)

(also known as 4,4'-(1-phenylethane-1,1-diyl)diphenol (bisphenol AP) or 1,1-bis(4-hydroxyphenyl)-1-phenyl-ethane).

Alternatively, the dihydroxy compounds of formula (3) may be the following formula (11):

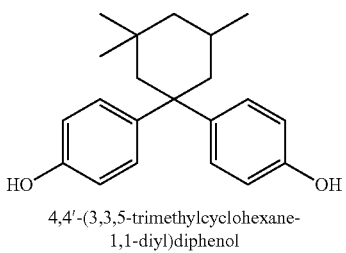

(11)

4,4'-(3,3,5-trimethylcyclohexane-1,1-diyl)diphenol (bisphenol TMC) or 1,1-bis(4-hydroxyphenyl)-3,3,5-trimethylcyclohexane).

(2) Polyester Polycarbonates

The first polycarbonate may be a copolymer comprising different R1 moieties in the carbonate. The copolymer may comprise other types of polymer units, such as ester units, and combinations comprising at least one of homopolycarbonates and copolycarbonates as described above in section (1) of the first polycarbonate. A specific type of copolymer may be a polyester carbonate, also known as a polyester-polycarbonate. Such copolymers further contain, in addition to recurring carbonate chain units of the formula (1) as described above, repeating units of formula (12):

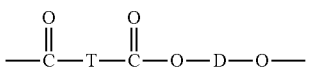

(12)

wherein O-D-O is a divalent group derived from a dihydroxy compound, and D may be, for example, one or more alkyl containing $C_6$-$C_{20}$ aromatic group(s), or one or more $C_6$-$C_{20}$ aromatic group(s), a $C_{2-10}$ alkylene group, a $C_{6-20}$ alicyclic group, a $C_{6-20}$ aromatic group or a polyoxyalkylene group in which the alkylene groups contain 2 to about 6 carbon atoms, specifically 2, 3, or 4 carbon atoms; and T divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In one embodiment, D may be a $C_{2-30}$ alkylene group having a straight chain, branched chain, or cyclic (including polycyclic) structure. In another embodiment, O-D-O may be derived from an aromatic dihydroxy compound of formula (3) above. In another embodiment, O-D-O may be derived from an aromatic dihydroxy compound of formula (4) above. In another embodiment, O-D-O may be derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids may be terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another embodiment, D may be a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate may be derived from the reaction of a combination of isophthalic and terephthalic diacids (or derivatives thereof) with resorcinol. In another embodiment, the polyester unit of a polyester-polycarbonate may be derived from the reaction of a combination of isophthalic acid and terephthalic acid with bisphenol-A. In an embodiment, the polycarbonate units may be derived from bisphenol A. In another specific embodiment, the polycarbonate units may be derived from resorcinol and bisphenol A in a molar ratio of resorcinol carbonate units to bisphenol A carbonate units of 1:99 to 99:1.

Useful polyesters may include aromatic polyesters, poly(alkylene esters) including poly(alkylene arylates), and poly(cycloalkylene diesters). Aromatic polyesters may have a polyester structure according to formula (12), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these.

(3) Functional Characteristics of the First Polycarbonate

The first polycarbonate may have a glass transition temperature (Tg) of greater than 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method.

The first polycarbonate may have a percent haze value of less than or equal to 10.0%, 8.0%, 6.0%, 5.0%, 4.0%, 3.0%, 2.0%, 1.0%, 1.5%, or 0.5% as measured at a certain thickness according to ASTM D 1003-07. The first polycarbonate may be measured at a 2.0, 2.2, 2.4, 2.6, 2.8, 3.0, 3.2, 3.4, 3.6, 3.8, or a 4.0 millimeter thickness. The first polycarbonate may be measured at a 0.125 inch thickness. The first polycarbonate may have a light transmittance greater than or equal to 50%, 60%, 65%, 70%, 75%, 80%, 85%, 90%, or 95%, as measured at 3.2 millimeters thickness according to ASTM D 1003-07. The first polycarbonate exhibits a heat resistance higher than the levels achieved with BPA homopolymer as described in the Examples. In one embodiment, the first polycarbonate must have a glass transition temperature of greater than 170° C.

b. Second Polycarbonate—Siloxane

Described herein is the second polycarbonate of the polycarbonate blend composition. The second polycarbonate is a polycarbonate polysiloxane copolymer. The polycarbonate polysiloxane copolymer has a polysiloxane structural unit and a polycarbonate structural unit. The polycarbonate structural unit of the polycarbonate polysiloxane copolymer may be derived from carbonate units of formula (1) as described above. The carbonate units may be derived from one or more dihydroxy monomers of formula (3) including bisphenol compound of formula (4), both as described and incorporated herein from above. The dihydroxy compound may be bisphenol-A.

The polysiloxane structural unit may be derived from a siloxane-containing dihydroxy compounds (also referred to herein as "hydroxyaryl end-capped polysiloxanes") that contains diorganosiloxane units blocks of formula (13):

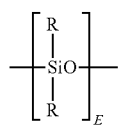

(13)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent polycarbonate is desired, R does not contain any halogen. Combinations of the foregoing R groups can be used in the same polycarbonate.

The value of E in formula (13) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (14):

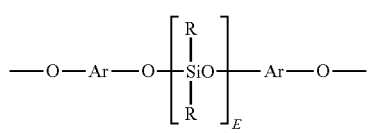

(14)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. —O—Ar—O— groups in formula (14) can be, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl) cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (15):

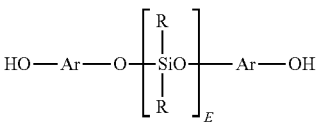

(15)

wherein Ar and E are as described above. Compounds of formula (15) can be obtained by the reaction of a dihydroxyaromatic compound with, for example, an alpha, omega-bis-acetoxy-polydiorganosiloxane oligomer under phase transfer conditions. Compounds of formula (15) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (16):

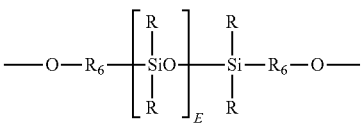

(16)

wherein R and E are as described above, and each $R_6$ is independently a divalent $C_1$-$C_{30}$ organic group such as a $C_1$-$C_{30}$ alkyl, $C_1$-$C_{30}$ aryl or $C_1$-$C_{30}$ alkylaryl. The polysiloxane blocks corresponding to formula (16) are derived from the corresponding dihydroxy compound of formula (17):

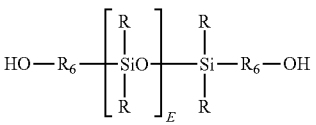

(17)

wherein R and E and $R_6$ are as described for formula (16).

In a specific embodiment, the second polycarbonate comprises carbonate units derived from a polysiloxane monomer having the structure (17):

(17)

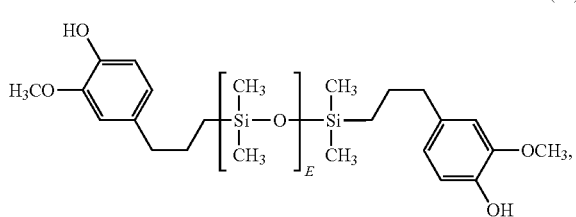

wherein E is an average value of between 20 and 75.

In another specific embodiment the second polycarbonate comprises carbonate units derived from a polysiloxane monomer having the structure (18):

(18)

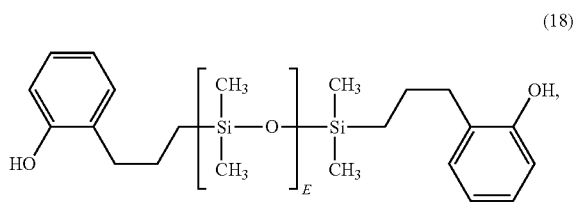

wherein E is an average value of between 20 and 75.

In a specific embodiment, the polydiorganosiloxane blocks are provided by repeating structural units of formula (19)

(19)

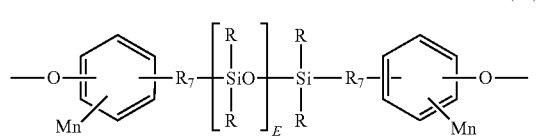

wherein R and E are as defined above. $R_7$ in formula (19) is a divalent $C_2$-$C_8$ aliphatic group. Each M in formula (19) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M of formula (19) is bromo or chloro, an alkyl group such as methyl, ethyl, or propyl, an alkoxy group such as methoxy, ethoxy, or propoxy, or an aryl group such as phenyl, chlorophenyl, or tolyl, n=0 to 4; $R_7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R_7$ is a divalent $C_1$-$C_3$ aliphatic group, and R is methyl.

Polysiloxane-polycarbonates comprising units of formula (19) can be derived from the corresponding dihydroxy polydiorganosiloxane (20):

(20)

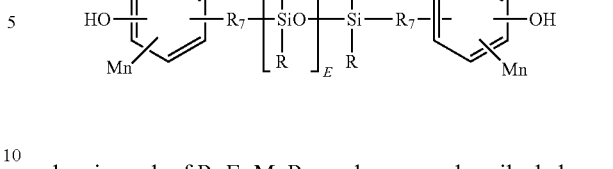

wherein each of R, E, M, $R_7$, and n are as described above. Such dihydroxy polysiloxanes can be made by effecting a platinum-catalyzed addition between a siloxane hydride of formula (21):

(21)

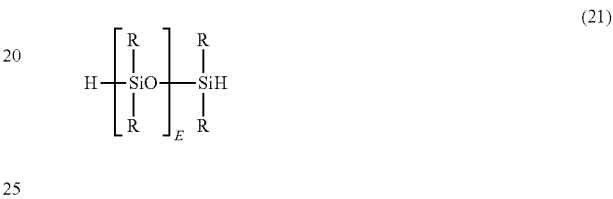

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

(1) Polysiloxane-Polycarbonate Blends

In an embodiment, the polysiloxane-polycarbonate can comprise polysiloxane blocks, which may or may not be derived from the corresponding dihydroxy polysiloxane compound, present in an amount of 0.15 wt % to 30 wt %, 0.5 wt % to 25 wt %, 1 to 20 wt %, 5 wt % to 7 wt %, 4 wt % to 6 wt %, or 4 wt % to 8 wt % based on the total weight of polysiloxane blocks and carbonate units or the total weight of the blend composition. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

In an embodiment, the carbonate units comprising the polysiloxane-polycarbonate are present in an amount of 70 wt % to 99.85 wt %, specifically 75 wt % to 99.5 wt %, and more specifically 80 wt % to 99 wt % based on the total weight of polysiloxane blocks and carbonate units. In a specific embodiment, the carbonate units are present in an amount of 90 wt % to 99 wt %, specifically 91 wt % to 98 wt %, and more specifically 92 wt % to 97 wt %, based on the total weight of polysiloxane blocks and carbonate units.

The polysiloxane-polycarbonate may be a blend of 4,4'-dihydroxy-2,2-diphenylpropane) with a block copolymer of polycarbonate and eugenol capped polydimethylsilioxane (PDMS) having the structure as shown below:

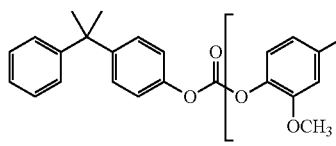 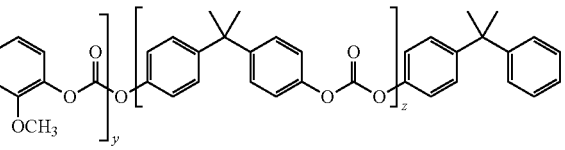

c. Functional Characteristics of the Second Polycarbonate

The second polycarbonate may have a percent haze value of less than or equal to 10.0%, 8.0%, 6.0%, 5.0%, 4.0%, 3.0%, 2.0%, 1.0%, 1.5%, or 0.5% as measured at 3.2 millimeters thickness according to ASTM D 1003-07. The second polycarbonate may have a percent haze value of less than or equal to 3.0% as measured at 3.2 millimeters thickness according to ASTM D 1003-07. The second polycarbonate may exhibit 100% ductility at −20° C. as measured using the method of ASTM D 256-10. The second polycarbonate may be measured at a 0.125 inch thickness.

3. METHOD OF MAKING FIRST AND SECOND POLYCARBONATES

Polycarbonates can be manufactured by processes such as interfacial polymerization and melt polymerization. High Tg copolycarbonates are generally manufactured using interfacial polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 10. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^3)_4Q^+X$, wherein each R3 is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl−, Br−, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

The polycarbonate may be prepared by a melt polymerization process. Generally, in the melt polymerization process, polycarbonates are prepared by co-reacting, in a molten state, the dihydroxy reactant(s) (i.e. aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

a. End Capping Agent

All types of polycarbonate end groups are contemplated as being useful in the high and low Tg polycarbonates, provided that such end groups do not significantly adversely affect desired properties of the compositions. An end-capping agent (also referred to as a chain-stopper) can be used to limit molecular weight growth rate, and so control molecular weight of the first and/or second polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned.

Endgroups can derive from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC, and is an ester endgroup derived from a salicylic acid ester, having the structure of formula (22):

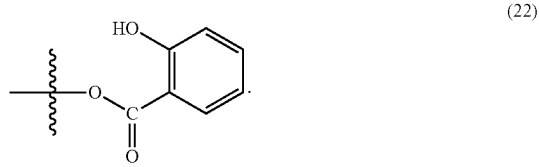 [SMILES: *OC(=O)c1ccccc1O]

(22)

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stifling. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028. In another specific embodiment, the activated aromatic carbonate is BMSC.

b. Branching Groups

Polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

4. OTHER ADDITIVES a. Impact Modifiers

The polycarbonate blend composition may further comprise impact modifiers. For example, the composition can further include impact modifier(s), with the proviso that the additives are selected so as to not significantly adversely affect the desired properties of the composition. Suitable impact modifiers may be high molecular weight elastomeric materials derived from olefins, monovinyl aromatic monomers, acrylic and methacrylic acids and their ester derivatives, as well as conjugated dienes. The polycarbonate blend composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

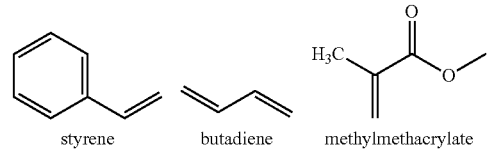

styrene  butadiene  methylmethacrylate

SEBS may be a linear triblockcopolymer based on styrene and ethylene/butylene. Each copolymer chain that may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of copolycarbonate, polysiloxane-polycarbonate, and any additional polymer. Impact modifiers may include MBS and SBS.

b. UV Stabilizers

The polycarbonate blend composition may further comprise a UV stabilizer for improved performance in UV stabilization. UV stabilizers disperse the UV radiation energy.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octloxybenzophenoe (Uvinul®3008), 6-tert-butyl-2-(5-chloro-2H-benzotriazole-2-yl)-4-methylphenyl (Uvinul® 3026), 2,4-di-tert-butyl-6-(5-chloro-2H-benzotriazole-2-yl)-phenol (Uvinul®3027), 2-(2H-benzotriazole-2-yl)-4,6-di-tert-pentylphenol (Uvinul®3028), 2-(2H-benzotriazole-2-yl)-4-(1, 1,3,3-tetramethylbutyl)-phenol (Uvinul® 3029), 1,3-bis [(2'cyano-3',3'-diphenylacryloyl)oxy]-2,2-bis-[(2'-cyano-3', 3'-diphenylacryloyl)oxy]methyl I-propane (Uvinul® 3030), 2-(2H-benzotriazole-2-yl)-4-methylphenol (Uvinul® 3033), 2-(2H-bezhotriazole-2-yl)-4,6-bis(1-methyl-1-phenyethyl) phenol (Uvinul® 3034), ethyl-2-cyano-3,3-diphenylacrylate (Uvinul® 3035), (2-ethylhexyl)-2-cyano-3,3-diphenylacrylate (Uvinul® 3039), N,N'-bisformyl-N,N'-bis(2,2,6,6-tetramethyl-4-piperidinyl)hexamethylendiamine (Uvinul® 4050H), bis-(2,2,6,6-tetramethyl-4-pipieridyl)-sebacate (Uvinul® 4077H), bis-(1,2,2,6,6-pentamethyl-4-piperdiyl)-sebacate+methyl-(1,2,2,6,6-pentamethyl-4-piperidyl)-sebacate (Uvinul® 4092H) or combination thereof.

The polycarbonate blend composition may comprise one or more UV stabilizers, including Cyasorb 5411, Cyasorb UV-3638, Uvinul 3030, and/or Tinuvin 234.

Certain monophenolic UV absorbers, which can also be used as capping agents, can be utilized as one or more additives; for example, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

c. Colorants

Colorants such as pigment and/or dye additives may be present in the composition. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1, 3,4-oxadiazole; 2,5-bis-(4-biphenylyl)-oxazole; 2,2'-dimethyl-p-quaterphenyl; 2,2-dimethyl-p-terphenyl; 3,5,3'''', 5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polycarbonate component of the blend composition.

d. Flame Retardants

Various types of flame retardants can also be utilized as additives. In one embodiment, the flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the polycarbonate compositions disclosed herein.

In another embodiment, the flame-retardants are selected from at least one of the following: alkali metal salts of perfluorinated $C_{1-16}$ alkyl sulfonates; potassium perfluorobutane sulfonate; potassium perfluoroctane sulfonate; tetraethylammonium perfluorohexane sulfonate; and potassium diphenylsulfone sulfonate.

In another embodiment, the flame retardant is not a bromine or chlorine containing composition.

In another embodiment, the flame retardant additives include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula (GO)3P=O, wherein each G is independently an alkyl, cycloalkyl, aryl, alkylaryl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl)phosphate, ethyl diphenyl phosphate, 2-ethylhexyl di(p-tolyl)phosphate, bis (2-ethylhexyl) p-tolyl phosphate, tritolyl phosphate, bis(2-ethylhexyl) phenyl phosphate, tri(nonylphenyl)phosphate, bis(dodecyl) p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful as additives, for example, compounds of the formulas below:

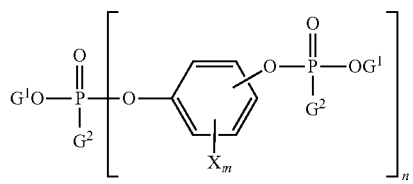

(23)

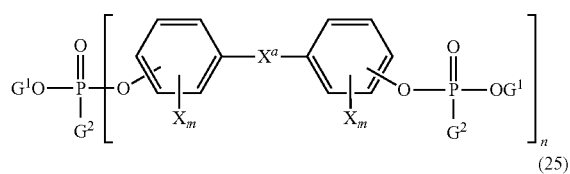

(24)

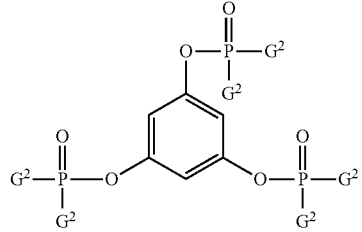

(25)

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phosphine oxide.

The flame retardant additive may have formula (26):

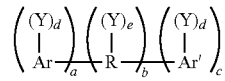

(26)

wherein R is a $C_{1-36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (26) are each independently mono- or polycarbocyclic aromatic groups such as phenylene, biphenylene, terphenylene, naphthylene, or the like.

Y is an organic, inorganic, or organometallic radical, for example (1) halogen, e.g., chlorine, bromine, iodine, fluorine or (2) ether groups of the general formula OB, wherein B is a monovalent hydrocarbon group similar to X or (3) monovalent hydrocarbon groups of the type represented by R or (4) other substituents, e.g., nitro, cyano, and the like, said substituents being essentially inert provided that there is greater than or equal to one, specifically greater than or equal to two, halogen atoms per aryl nucleus. One or both of Ar and Ar' may further have one or more hydroxyl substituents.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (26) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl) ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis- (3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula $(R_2SiO)y$ wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

When present, the foregoing flame retardant additives are generally present in amounts of 0.01 to 10 wt %, more specifically 0.02 to 5 wt %, based on 100 parts by weight of the polymer component of the thermoplastic composition.

In addition to the flame retardant, for example, the herein described polycarbonates and blends can include various additives ordinarily incorporated in polycarbonate compositions, with the proviso that the additives are selected so as to not significantly adversely affect the desired properties of the polycarbonate, such as transparency. Combinations of additives can be used. Such additives can be mixed at a suitable time during the mixing of the components for forming the polycarbonate and/or blend.

e. Heat Stabilizers

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 part by weight, based on 100 parts by weight of the polymer component of the thermoplastic composition.

5. MIXERS AND EXTRUDERS

The polycarbonate blend composition can be manufactured by various methods. For example, the first and second polycarbonates may be first blended in a high speed HENSCHEL-Mixer®. Other low shear processes, including but not limited to hand mixing, can also accomplish this blending. The blend may then be fed into the throat of a single or twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

6. ARTICLES

Shaped, formed, or molded articles comprising the polycarbonate resin compositions are provided herein. The compositions can be molded into useful shaped articles by a variety of means such as injection molding, extrusion, rotational molding, blow molding and thermoforming to form articles such as, for example, various components for cell phones and cell phone covers, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

Example 1

Polycarbonate/Polysiloxane Compositions and Characteristics Thereof

Various polycarbonate blends according to the Formulations specified below in Table 1 were tested for various attributes such as heat resistance, ductility, impact strength, and transparency and the results are shown in Table 2.

TABLE 1

| Formulation | 1 | 2 | 3 | 4 | 5 | 6 | 7 | 8 |
|---|---|---|---|---|---|---|---|---|
| PC-polysiloxane resin | 85 | 75 | 85 | 75 | — | — | — | — |
| PC-1 resin | — | — | 5 | 8.3 | 57 | 50 | 100 | 67 |
| PC-2 resin | — | — | 10 | 16.7 | 28 | 25 | — | 33 |
| XHT resin | 15 | 25 | — | — | 15 | 25 | — | — |

The weight-averaged molecular weights (Mw) of the resins listed in Table 1 were all measured by a standard gel permeation chromatography method using Bisphenol-A polycarbonate standards. The PC-polysiloxane resin of Table 1 is a polycarbonate-siloxane co-polymer, which has a molecular weight of 23,000 and contains 6% siloxane. Such a resin may be made by the method described in U.S. Pat. No. 6,833,422, which is herein incorporated by reference in its entirety.

The PC-1 resin of Table 1 is a 2,2-bis(4-hydroxyphenyl) propane polycarbonate resin, which is cumyl phenol end capped. The PC-1 resin has a molecular weight (Mw) of 30,000 and a Tg of 149° C.

The PC-2 resin of Table 1 is a 2,2-bis(4-hydroxyphenyl) propane polycarbonate resin, which is cumyl phenol end capped. The PC-2 resin has a molecular weight (Mw) of 22,000 and a Tg of 148° C.

The XHT resin of Table 1 is a polycarbonate consisting of 33 mole % of 3,3-bis(4-hydroxyphenyl)-2-phenylisoindolin-1-one (PPPBP) and 67 mole % 2,2-bis(4-hydroxyphenyl) propane. The XHT resin has a molecular weight (Mw) of 23,000 and a Tg of 198° C.

TABLE 2

Formulation Characteristics and Properties

| Formulation | (1) | (2) | (3) | (4) | (5) | (6) | (7) | (8) |
|---|---|---|---|---|---|---|---|---|
| Glass Transition Temp (Tg) | 150.1 | 152.1 | 143.9 | 145.5 | 155.9 | 159.8 | 150.1 | 148.6 |
| MVR-360 cm3/10 min. | 8.38 | 7.57 | 11.4 | 12.5 | 8.07 | 7.77 | 6.79 | 10.2 |
| % T std % | 82.4 | 77.4 | 85.5 | 85.2 | 89.7 | 89.6 | 89.9 | 89.8 |
| % haze std % | 2.74 | 5.93 | 1.57 | 1.61 | 0.28 | 0.29 | 0.21 | 0.3 |
| Cnd: Temperature/1° C. | −10 | −10 | −10 | −10 | −10 | −10 | −10 | −10 |
| Ductility/0% | 100 | 0 | 100 | 100 | 0 | 0 | 100 | 100 |
| Impact Strength-Avg/0 J/M | 594 | 495 | 709 | 713 | 231 | 146 | 803 | 823 |
| Cnd: Temperature/1° C. | −20 | −20 | −20 | −20 | −20 | −20 | −20 | −20 |
| Ductility/0% | 100 | 0 | 100 | 100 | 0 | 0 | 100 | 0 |
| Impact Strength-Avg/0 J/M | 579 | 471 | 700 | 728 | 157 | 136 | 852 | 182 |
| Cnd: Temperature/1° C. | −30 | −30 | −30 | −30 | −30 | −30 | −30 | −30 |
| Ductility/0% | 0 | 0 | 100 | 100 | 0 | 0 | 0 | 0 |
| Impact Strength-Avg/0 J/M | 512 | 394 | 686 | 688 | 134 | 128 | 318 | 150 |
| Cnd: Temperature/1° C. | −40 | −40 | −40 | −40 | −40 | −40 | −40 | −40 |
| Ductility/0% | 0 | 0 | 0 | 0 | 0 | 0 | 0 | 0 |
| Impact Strength-Avg/0 J/M | 482 | 248 | 646 | 655 | 133 | 118 | 156 | 138 |

All Formulations were prepared by dry blending and extruded with a Werner Pfeidlere 30 mm twin screw at a temperature profile of 520° F. to 550° F. and cutting into pellets, and injection molding at 540° F. to 580° F.

A glass transition temperature test was conducted with each of the Formulations. Measurement of glass transition temperature (row 2) for each of the formulations indicated that the PC-polysiloxane resin/XHT resin blends (Formulations 1 and 2) do not significantly differ from the glass transition temperature of polycarbonate resins (Formulations 7 and 8).

Similarly, a melt volume flow rate test (MVR) was conducted using ASTM D 1238-10 at 1.2 kg at 300° C. MVR data indicates that with the exception of Formulation 2 (75% PC-polysiloxane/25% XHT) and Formulation 7 (low melt flow polycarbonate PC-1), the PC-polysiloxane/XHT blends meet the targeted 8 to 12 standard. Formulation 2 was only slightly below the targeted 8 standard.

Formulations 1 and 2 exhibited only slightly deteriorated optical performance vs standard PC-polysiloxane resin Formulations 3 and 4. The percent transparency decreased only slightly in Formulations 1 and 2 as compared to the levels of transparency to PC-polysiloxane alone (Formulations 3 and 4). Formulation 1 with 85% PC-polysiloxane showed an 82.4% transparency in comparisons to 85.5% transparency to Formulation 3 with the same percentage of PC-polysiloxane. The percent haze using ASTM D 1003-7 at 0.125 inches in part thickness also showed a similar numbers when comparing Formulation 1 with Formulation 3.

The impact performance test using ASTM D 256-10 (Notched Izod Measurements) was conducted at four different temperatures for each of the Formulations (i.e., −10° C., −20° C., −30° C., and −40° C.). The Izod test at low temperatures was used to differentiate amongst the Formulations by comparing the temperatures at which the Formulations undergo a ductile/brittle transition. At −20° C., Formulation 1 (85% PC-polysiloxane/15% XHT) provided similar impact strength (J/M) ductility at −20° C. as Formulation 3 (85% PC-polysiloxane/15% PC-1).

Example 2

Additional Polycarbonate/Polysiloxane Compositions and Characteristics Thereof Various polycarbonate blends according to the Formulations specified below in Table 3 were tested for various attributes such as heat resistance, ductility, impact strength and transparency and the results are shown in Table 4.

TABLE 3

| Formulation | 1 | 2 | 3 | 4 | 5 | 6 | 7 | 8 | 9 | 10 |
|---|---|---|---|---|---|---|---|---|---|---|
| PC-polysiloxane resin | 85 | 85 | 85 | 85 | 85 | 75 | 75 | 75 | 75 | — |
| PC-1 | — | — | — | — | 5 | — | — | — | 8.3 | 67 |
| PC-2 | — | — | — | — | 10 | — | — | — | 16.7 | 33 |
| XHT Resin | 15 | — | — | — | — | 25 | — | — | — | — |
| PPC Resin | — | — | 15 | — | — | — | — | 25 | — | — |
| Bisphenol TMC resin | — | 15 | — | — | — | — | 25 | — | — | — |
| Bisphenol AP resin | — | — | — | 15 | — | — | — | — | — | — |

The PC-polysiloxane resin of Table 3 is a polycarbonate-siloxane co-polymer, which has a molecular weight (Mw) of 23,000 and contains 6% siloxane. Such a resin may be made by the method described in U.S. Pat. No. 6,833,422, which is herein incorporated by reference in its entirety.

The PC-1 resin of Table 3 is a 2,2-bis(4-hydroxyphenyl) propane polycarbonate resin, which is cumyl phenol end capped. The PC-1 resin has a molecular weight of 30,000.

The PC-2 resin of Table 3 is a 2,2-bis(4-hydroxyphenyl) propane polycarbonate resin, which is cumyl phenol end capped. The PC-2 resin has a molecular weight of 22,000.

The XHT resin of Table 3 is a polycarbonate consisting of 33 mole % of 3,3-bis(4-hydroxyphenyl)-2-phenylisoindolin-1-one and 67 mole % 2,2-bis(4-hydroxyphenyl)propane. The XHT resin has a molecular weight (Mw) of 23,000 and a Tg of 198° C.

The PPC resin of Table 3 is a polyestercarbonate consisting of 26 mole % of 2,2-bis(4-hydroxyphenyl)propane polycarbonate, 69 mole % of 2,2-bis(4-hydroxyphenyl)propane isophthalate polyester, and 5 mole % 2,2-Bis(4-hydroxyphenyl)propane teraphthalate polyester. The PPC resin has a molecular weight (Mw) of 28,500 and a Tg of 180° C.

The bisphenol TMC resin of Table 3 is a polycarbonate consisting of 33 mole % of 1,1-bis(4-hydroxyphenyl)-3,3,5-trimethylcyclohexane, and 67 mole % of 2,2-bis(4-hydroxyphenyl)propane. This bisphenol TMC resin has a molecular weight (Mw) of 26,000 and a Tg of 182° C.

The bisphenol AP resin of Table 3 is a polycarbonate consisting of 75 mole % of 1,1-bis(4-hydroxyphenyl)-1-phenyl-ethane, and 25 mole % of 2,2-bis(4-hydroxyphenyl) propane. The bisphenol AP resin has a molecular weight (Mw) of 22,600 and a Tg of 175° C.

TABLE 4

| Formulation | (1) | (2) | (3) | (4) | (5) | (6) | (7) | (8) | (9) | (10) |
|---|---|---|---|---|---|---|---|---|---|---|
| Glass Transition Temp (Tg) | 152.5 | 148.3 | 148.7 | 148 | 145.5 | 153.6 | 151.2 | 151 | 144.5 | 148.4 |
| MVR-360 cm3/10 min. | 8.66 | 8.81 | 7.65 | 9.64 | 11.1 | 7.65 | 8.05 | 6.32 | 11.9 | 10.3 |
| % haze std % | 2.54 | 1.37 | 3.11 | 1.78 | 1.46 | 6.65 | 1.65 | 8.31 | 1.42 | 0.35 |
| % T std % | 82.8 | 85.5 | 81.4 | 84.5 | 85.8 | 76.5 | 84.7 | 74.5 | 85.7 | 89.7 |
| Cnd: Temperature/1° C. | −10 | −10 | −10 | −10 | −10 | −10 | −10 | −10 | −10 | −10 |
| Ductility/0% | 100 | 0 | 100 | 100 | 100 | 0 | 100 | 100 | 100 | 100 |
| Impact Strength-Avg/0 J/M | 605 | 689 | 670 | 650 | 821 | 516 | 592 | 630 | 747 | 773 |
| Cnd: Temperature/1° C. | −20 | −20 | −20 | −20 | −20 | −20 | −20 | −20 | −20 | −20 |
| Ductility/0% | 80 | 100 | 100 | 100 | 100 | 0 | 0 | 100 | 100 | 0 |
| Impact Strength-Avg/0 J/M | 581 | 645 | 660 | 607 | 726 | 480 | 558 | 619 | 736 | 425 |
| Cnd: Temperature/1° C. | −30 | −30 | −30 | −30 | −30 | −30 | −30 | −30 | −30 | −30 |
| Ductility/0% | 0 | 100 | 100 | 100 | 100 | 0 | 0 | 80 | 100 | 0 |
| Impact Strength-Avg/0 J/M | 556 | 607 | 620 | 611 | 705 | 447 | 449 | 575 | 703 | 166 |
| Cnd: Temperature/1° C. | −40 | −40 | −40 | −40 | −40 | −40 | −40 | −40 | −40 | −40 |
| Ductility/0% | 0 | 0 | 0 | 0 | 80 | 0 | 0 | 0 | 40 | 0 |
| Impact Strength-Avg/0 J/M | 487 | 570 | 622 | 574 | 685 | 351 | 214 | 559 | 674 | 135 |

All formulations were prepared by dry blending and extruded with a Werner Pfeidlere 30 mm twin screw at a temperature profile of 520° F. to 550° F. The blended formulations were cut into pellets and injection molded at 540° F. to 580° F.

The glass transition temperature test indicated that each of the blends containing a polycarbonate or a polyestercarbonate with a Tg>170° C. had similar glass transition temperatures ranging from 152.5° C. for Formulation 1 to 148° C. for Formulation 9. The melt volume flow rate test (MVR) was conducted using ASTM D 1238-10 at 1.2 kg at 300° C. MVR data indicates that with the exception of Formulation 3 (85% PC-polysiloxane/15% PPC), the various formulations met the targeted standard of 6-12 or 8-12 for MVR.

Formulations 1-4 provided similar percent haze and transparency percentages as the non-heat resistant PC-polysiloxane/PC-1/PC-2 Formulation 5. Also, Formulations 1-4 provided similar impact strength numbers as Formulation 5. Formulation 1 provided 80% ductility at −20° C. while Formulations 2-4 provided 100% ductility at −20° C. and −30° C. Again, these formulations performed similar to the impact strength and ductility of Formulation 5 and better than Formulation 10.

Overall, similar trends were seen in formulations 6-10.

We claim:

1. A polycarbonate blend composition comprising:
   (a) a first polycarbonate having a glass transition temperature of greater than 170° C. as measured using a differential scanning calorimetry method, wherein the first polycarbonate is derived from:
   (i) one or more monomers having the structure

   HO-A$_1$-Y$_1$-A$_2$-OH wherein each of A$_1$ and A$_2$ comprise a monocyclic divalent arylene group, and Y$_1$ is a bridging group having one or more atoms, and wherein the structure is free of halogen atoms; or
   (ii) polyester monomer units having the structure

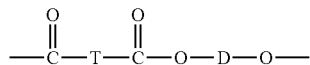

wherein D comprises one or more alkyl containing C$_6$-C$_{20}$, aromatic group(s), or one or more C$_6$-C$_{20}$ aromatic group(s), and T comprises a C$_6$-C$_{20}$ aromatic group; and
   (b) a second polycarbonate wherein the second polycarbonate is a polysiloxane block copolymer derived from
   (i) the structure

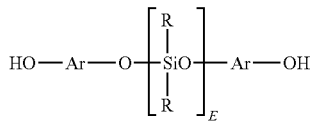

wherein R comprises a C$_1$-C$_{30}$ aliphatic, a C$_1$-C$_{30}$ aromatic group, or a combination thereof, wherein Ar comprises one or more C$_6$-C$_{30}$ aromatic group(s), one or more alkyl containing C$_6$-C$_{30}$ aromatic group(s), wherein E has an average value of 20-75; or
   (ii) the structure

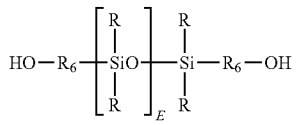

wherein R comprises a C$_1$-C$_{30}$ aliphatic, a C$_1$-C$_{30}$ aromatic group, or a combination thereof, wherein R$_6$ comprises C$_7$-C$_{30}$ aromatic group, or a combination of a C$_7$-C$_{30}$ aromatic group and a C$_7$-C$_{30}$ aliphatic group, wherein E has an average value of 20-75;
   wherein the blend composition has a glass transition temperature (Tg) between 148° C. and 155° C. as measured using a differential scanning calorimetry method;
   wherein the blend composition has a percent (%) haze of less than 3.5% and a % transmission of greater than 80% as measured using a method of ASTM D 1003-07;
   wherein the blend composition possesses 80% or greater ductility in a notched izod test at −20° C. at a thickness of 0.125 inches according to ASTM D 256-10.

2. The blend composition of claim 1, wherein the composition has an MVR of between 6 and 12 cm³/10 minute as measured at 300° C. at 1.2 kilograms using the method of ASTM D 1238-10.

3. The blend composition of claim 1, wherein the second polycarbonate further comprises a carbonate unit derived from the polysiloxane blocks having the structure

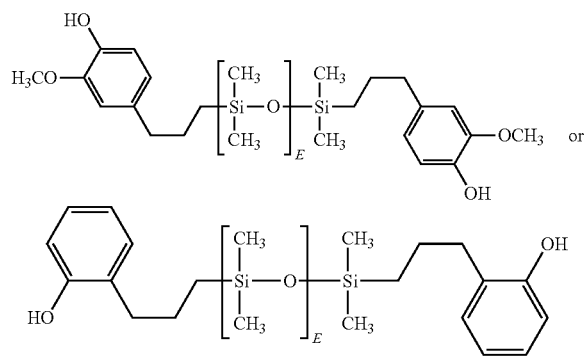

wherein E has an average value of between 20 and 75.

4. The blend composition of claim 1, wherein the first polycarbonate comprises carbonate units derived from at least one of the following monomers 3,3-bis(4-hydroxyphenyl)-2-phenylisoindolin-1-one (PPPBP), 1,1-bis(4-hydroxyphenyl)-1-phenyl-ethane (Bisphenol-AP), and 1,1-bis(4-hydroxyphenyl)-3,3,5-trimethyl-cyclohexane (Bisphenol-TMC).

5. The blend composition of claim 4, wherein the first polycarbonate comprises greater than 30 wt % of carbonate units derived from at least one of the following 3,3-bis(4-hydroxyphenyl)-2-phenylisoindolin-1-one (PPPBP), 1,1-bis (4-hydroxyphenyl)-1-phenyl-ethane (Bisphenol-AP), and 1,1-bis(4-hydroxyphenyl)-3,3,5-trimethyl-cyclohexane (Bisphenol-TMC).

6. The blend composition of claim 5, wherein the first polycarbonate has a % haze of less than 1.5% as measured using the method of ASTM D 1003-07 at 0.125 inches in part thickness.

7. The blend composition of claim 4, wherein the first polycarbonate further comprises carbonate units derived from 2,2-bis(4-hydroxyphenyl)propane (Bisphenol-A).

8. The blend composition of claim 5, wherein the first polycarbonate further comprises carbonate units derived from 2,2-bis(4-hydroxyphenyl)propane (Bisphenol-A).

9. The blend composition of claim 1, wherein the first polycarbonate comprises aromatic ester units derived from isophthalic acid or terephthalic acids or isophthalic acid esters or terephthalic esters or a combination isophthalic acid or terephthalic acids or isophthalic acid esters or terephthalic acid esters.

10. The blend composition of claim 9, wherein the first polycarbonate further comprises carbonate units or ester units derived from Bisphenol-A.

11. The blend composition of claim 1, wherein the second polycarbonate has a haze of less than 3% as measured using the method of ASTM D 1003-07 at 0.125 inches in part thickness having 100% ductility at −20° C. as measured using the method of ASTM D 256-10 at 0.125 inches in part thickness.

12. The blend composition of claim 1, wherein the first and second polycarbonates are made from either an interfacial polymerization process and/or a melt polymerization process.

13. The blend composition of claim 1, wherein the wt % siloxane in the second polycarbonate is between 5 wt % and 7 wt % based on the total weight of the second polycarbonate.

14. The blend composition of claim 1, wherein the wt % of the siloxane in the blend composition is between 4 wt % and 6 wt % based on the total weight of the polycarbonate blend composition.

15. The blend composition of claim 1, wherein the second polycarbonate comprises greater than 75 wt % of the polycarbonate blend composition and wherein the first polycarbonate comprises less than 25 wt % of the polycarbonate blend composition based on the sum of the first and second polycarbonates being equal to 100 wt %.

16. The blend composition of claim 1, wherein the first polycarbonate comprises 4,4'-(3,3,5-trimethylcyclohexane-1,1-diyl)diphenol.

17. A polycarbonate blend composition comprising:
(a) a first polycarbonate, which is a copolycarbonate having a glass transition temperature of 170° C. or greater as measured using differential scanning calorimetry and derived from a combination of bisphenol-A and a second monomer that is free of halogens and having the structure

HO-A₁-Y₁-A₂-OH wherein each of $A_1$ and $A_2$ comprises a monocyclic divalent arylene group, and Y1 comprises at least one of the following: —O—, —S—, —S(O)—, —S(O)₂—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene, wherein $A_1$, $A_2$, and $Y_1$ are free of halogen atoms; and
(b) a second polycarbonate, which is a polysiloxane block copolycarbonate derived from at least bisphenol-A and

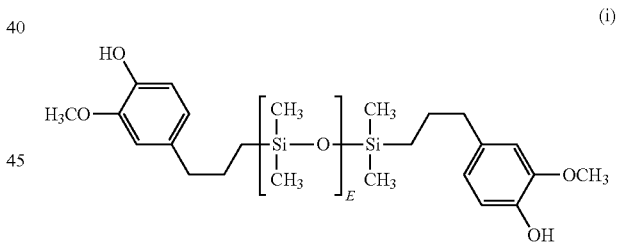

wherein the average value of E is between 30 and 50, or

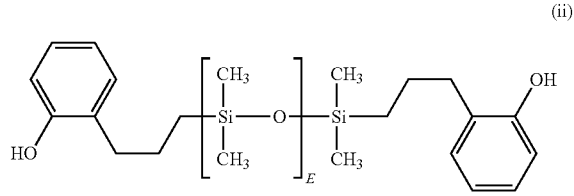

wherein the average value of E is between 30 and 50, wherein the siloxane content in the polysiloxane block co-polycarbonate is between 2 wt % and 10 wt % siloxane based on the total weight of the polysiloxane block co-polycarbonate;

wherein the polycarbonate blend composition comprises between 10% and 20% of the first polycarbonate and between 90 wt % and 80 wt % of the second polycarbonate based on the sum of the first and the second polycarbonate being equal to 100 wt %;

wherein the polycarbonate blend composition has a glass transition temperature (Tg) of between 148° C. and 155° C. as measured using a differential scanning calorimetry method;

wherein the polycarbonate blend composition has a % haze of less than 3% and a % transmission of greater than 80% as measured using the method of ASTM D 1003-07; and wherein the polycarbonate blend composition possesses at least 75% ductility in a notched izod test at −20° C. at a thickness of 0.125 inches according to ASTM D 256-10.

18. The blend composition of claim 17, wherein the first polycarbonate is derived from at least Bisphenol-A and one or more of the monomers, 3,3-bis(4-hydroxyphenyl)-2-phenylisoindolin-1-one (PPPBP), Bisphenol-AP, Bisphenol-TMC or a combination of isophthalic and phthalic acids or a combination of isophthalic and phthalic acid esters.

19. The blend composition of claim 18 further comprising at least one of the following additives: mold release agents, thermal stabilizers, UV stabilizers, or colorants.

20. A method for making the polycarbonate blend composition of claim 1 comprising the step of
(a) selecting the first polycarbonate of claim 1;
(b) selecting the second polycarbonate of claim 1; and
(c) blending the first polycarbonate with the second polycarbonate to form a composition having a glass transition temperature (Tg) of between 145° C. and 155° C. as measured using a differential scanning calorimetry method, a % haze of less than 3.5% and a % transmission of greater than 80% as measured using the method of ASTM D 1003-07; and, possesses 80% or greater ductility in a notched izod test at −20° C. at a thickness of 0.125 inches according to ASTM D 256-10.

21. The method of claim 20, wherein
(a) the first polycarbonate comprises carbonate units derived from at least Bisphenol-A and one or more of the following monomers (i) PPPBP;
(ii) Bisphenol-A;
(iii) Bisphenol-TCM;
(iv) a combination of isophthalic and phthalic acids; and
(v) a combination of isophthalic and phthalic acid esters; and (b) the second polycarbonate comprises carbonate units derived from Bisphenol-A and

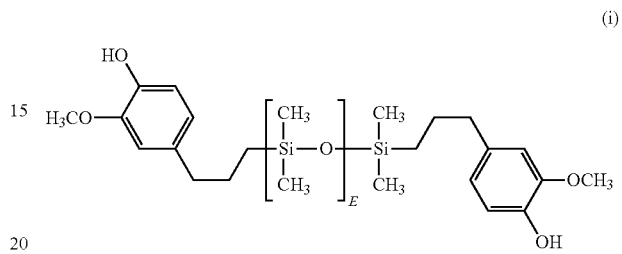

(i)

wherein the average value of E is between 30 and 50, or

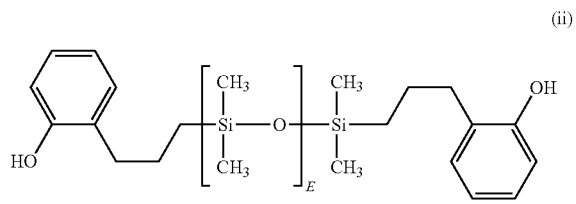

(ii)

wherein the average value of E is between 30 and 50.

22. The method of claim 21, wherein step (c) comprises extrusion.

23. An article molded from the polycarbonate blend composition of claim 1.

24. The article of claim 23, wherein the article is a component of a cell phone cover or computer housing.

* * * * *